US009004422B2

(12) United States Patent
Feenstra

(10) Patent No.: US 9,004,422 B2

(45) Date of Patent: Apr. 14, 2015

(54) FIRE PROTECTION SPRINKLER SUPPORT SYSTEM

(71) Applicant: The Viking Corporation, Hastings, MI (US)

(72) Inventor: Shawn J. Feenstra, Caledonia, MI (US)

(73) Assignee: The Viking Corporation, Hastings, MI (US)

( * ) Notice: Subject to any disclaimer, the term of this patent is extended or adjusted under 35 U.S.C. 154(b) by 0 days.

(21) Appl. No.: 13/625,303

(22) Filed: Sep. 24, 2012

(65) Prior Publication Data

US 2013/0105641 A1 May 2, 2013

Related U.S. Application Data

(63) Continuation-in-part of application No. 13/287,200, filed on Nov. 2, 2011.

(51) Int. Cl.

| | |
|---|---|
| ***E04B 9/20*** | (2006.01) |
| ***A62C 35/68*** | (2006.01) |
| ***E04B 9/18*** | (2006.01) |
| ***E04B 9/00*** | (2006.01) |
| ***F16L 3/24*** | (2006.01) |

(52) U.S. Cl.

CPC . *A62C 35/68* (2013.01); *E04B 9/18* (2013.01); *E04B 9/006* (2013.01); *E04B 9/20* (2013.01); *F16L 3/24* (2013.01)

(58) Field of Classification Search

CPC ........... A62C 35/68; F16L 3/24; E04B 9/006; E04B 9/18; E04B 9/20

USPC .......... 248/75, 200.1, 342, 344, 72, 343, 340; 169/37, 51; 52/25, 39, 506.06, 506.07, 52/713; 362/148, 150

See application file for complete search history.

(56) References Cited

U.S. PATENT DOCUMENTS

| | | | | |
|---|---|---|---|---|
| 1,442,209 | A | 1/1923 | Yoders et al. | |
| 1,585,840 | A | 5/1926 | Fahnestock | |
| 1,942,701 | A | 1/1934 | Hilton | |
| 2,297,869 | A * | 10/1942 | Biller | 248/343 |
| 2,616,646 | A | 11/1952 | Matthysse | |
| 3,329,387 | A | 7/1967 | Fischer | |

(Continued)

FOREIGN PATENT DOCUMENTS

| | | | |
|---|---|---|---|
| EP | 1118355 | A1 * | 7/2001 |
| JP | H0683047 | U | 11/1994 |

(Continued)

*Primary Examiner* — Terrell McKinnon

*Assistant Examiner* — Eret McNichols

(74) *Attorney, Agent, or Firm* — Harness, Dickey & Pierce, P.L.C.

(57) ABSTRACT

A support system for a fire protection sprinkler includes a support bar having a pair of end brackets disposed at the ends of the support bar. A center bracket assembly is mounted on the support bar and includes a support bracket and a hinge bracket pivotally connected to the support bracket by a hinge pin. The pair of end bracket assemblies each include an outside bracket and an inside bracket secured to the outside bracket wherein at least one of the outside and the inside bracket has an upper end connected to the support bar and includes an angled body extending laterally outward from the upper end away from the center bracket wherein the outside and inside brackets define a channel therebetween for receiving an upper rail of a T-shaped rail of a drop ceiling system.

10 Claims, 6 Drawing Sheets

(56) References Cited

U.S. PATENT DOCUMENTS 3,377,038 A 4/1968 Loudon
3,599,921 A * 8/1971 Cumber ........................ 248/317
3,711,052 A 1/1973 Hoffman
3,797,789 A 3/1974 Wasson
3,998,020 A * 12/1976 Kuhr et al. ................. 52/506.07
3,998,419 A * 12/1976 Semmerling ................. 248/323
4,039,744 A 8/1977 Seaquist
4,041,657 A 8/1977 Schuplin
4,045,985 A 9/1977 Musgrave
4,060,025 A * 11/1977 Pelosi, Jr. ...................... 454/294
4,086,480 A 4/1978 Lahm
4,114,326 A 9/1978 Macuga et al.
4,114,327 A 9/1978 Williams
4,122,762 A 10/1978 Williams
4,126,971 A 11/1978 Macuga et al.
4,149,693 A 4/1979 LoNigro
4,294,054 A * 10/1981 Kuhr .......................... 52/506.07
4,630,423 A * 12/1986 Lind .......................... 52/506.06
4,717,099 A 1/1988 Hubbard
4,723,749 A 2/1988 Carraro et al.
4,834,186 A 5/1989 Ballard
4,905,952 A 3/1990 Pinquist
5,619,263 A 4/1997 Laughlin et al.
6,119,784 A 9/2000 MacDonald, III et al.
6,123,154 A 9/2000 MacDonald, III et al.
6,260,810 B1 7/2001 Choi
6,354,800 B1 3/2002 Hays
6,488,097 B1 12/2002 MacDonald, III et al.
6,554,231 B2 4/2003 Choi
6,622,980 B2 * 9/2003 Boucher et al. .......... 248/231.51
6,682,031 B2 1/2004 Evans et al.
6,752,218 B2 6/2004 MacDonald, III et al.
6,761,341 B2 7/2004 Pfaller
6,811,130 B1 11/2004 Oh
7,032,680 B2 4/2006 MacDonald, III et al.
7,240,884 B2 7/2007 Shim
7,255,315 B2 8/2007 Oh
7,264,214 B2 9/2007 Oh
7,427,051 B2 9/2008 Oh
7,429,025 B1 9/2008 Gretz
7,455,268 B2 11/2008 Heath
7,478,787 B2 1/2009 Bankston et al.
7,506,845 B2 3/2009 Oh
7,735,787 B2 6/2010 Kafenshtok et al.
7,735,794 B1 6/2010 Gretz
7,784,746 B2 8/2010 Kafenshtok et al.
7,845,599 B2 12/2010 Jackson
7,878,464 B2 2/2011 Oh
8,109,482 B2 * 2/2012 Oh ................................ 248/342
8,272,615 B2 * 9/2012 Silcox et al. .................. 248/342
8,474,199 B2 * 7/2013 Oh ............................... 52/220.6
8,500,079 B2 * 8/2013 Oh ................................ 248/343
8,833,719 B2 * 9/2014 Lim .............................. 248/343
2001/0030269 A1 10/2001 Evans et al.
2002/0066834 A1 6/2002 Choi
2003/0029983 A1 2/2003 Pfaller
2005/0139743 A1 6/2005 Shim
2006/0192067 A1 8/2006 Oh
2007/0063121 A1 3/2007 Oh
2008/0099640 A1 5/2008 Kafenshtok et al.
2009/0065657 A1 3/2009 Heath
2010/0165646 A1 7/2010 Russo et al.
2011/0094760 A1 * 4/2011 Im ................................... 169/51
2011/0155865 A1 * 6/2011 Oh ............................... 248/67.7
2011/0284098 A1 11/2011 Silcox et al.
2011/0315409 A1 12/2011 Silcox et al.
2013/0048822 A1 2/2013 Liu et al.
2013/0161462 A1 * 6/2013 Haddock ....................... 248/237
2014/0238717 A1 * 8/2014 Korcz et al. ..................... 174/50

FOREIGN PATENT DOCUMENTS

JP H07151269 A 6/1995
KR 20130010807 A 1/2013
WO 2009082082 A1 7/2009
WO 2011097026 A1 8/2011

* cited by examiner

FIRE PROTECTION SPRINKLER SUPPORT SYSTEM

CROSS-REFERENCE TO RELATED APPLICATIONS

This application is a continuation-in-part of U.S. patent application Ser. No. 13/287,200, filed Nov. 2, 2011. The entire disclosure of the above application is incorporated herein by reference.

FIELD

The present disclosure relates to fire protection sprinklers and more particularly, to a support system for mounting fire protection sprinklers within a drop ceiling.

BACKGROUND

This section provides background information related to the present disclosure which is not necessarily prior art.

Fire protection sprinklers are commonly mounted in suspended ceiling structures by a support bar and bracket assembly system wherein the support bar is supported by a pair of end brackets which are mounted to a T-rail of the drop ceiling. A center bracket assembly is commonly used for engaging a sprinkler adapter to the support bar while a sprinkler head is suspended from the sprinkler adapter through an opening that is cut in a ceiling panel.

Various center bracket designs have been utilized for mounting the sprinkler adapter to the support bar. However, center brackets have had complicated designs and/or are cumbersome to install. Accordingly, it is desirable to provide a center bracket design that is easy to install and that is simple to manufacture.

With conventional fire protection sprinkler support systems, the support bar typically extends a full width of the space between opposing T-rails of the suspended ceiling system. In addition, the end support brackets typically extend directly vertically above the T-rail to which it is mounted. In some applications, the end brackets and support bar can interfere with the installation of light fixtures and other structures that are mounted within the suspended ceiling. Accordingly, it is desirable to provide a support system for a fire protection sprinkler that does not interfere with the installation of adjacent light fixtures and other structures within the suspending ceiling.

SUMMARY

This section provides a general summary of the disclosure, and is not a comprehensive disclosure of its full scope or all of its features.

A support system is provided for a fire protection sprinkler including a support bar having first and second ends and a pair of end brackets disposed at the ends of the support bar. A center bracket assembly is mounted on the support bar and includes a support bracket and a hinge bracket pivotally connected to the support bracket by a hinge pin. The hinge bracket and the support bracket combine to define an opening for receiving a sprinkler adapter therein, wherein the opening is disposed on a first side of the support bar and the hinge pin is disposed on the opposite side of the support bar from the first side.

According to a further aspect of the present disclosure, the pair of end bracket assemblies each include an outside bracket and an inside bracket secured to the outside bracket wherein at least one of the outside and the inside bracket has an upper end connected to the support bar and includes an angled body extending laterally outward from the upper end away from the center bracket wherein the outside and inside brackets define a channel therebetween for receiving an upper rail of a T-shaped rail of a drop ceiling system.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Figure 10:
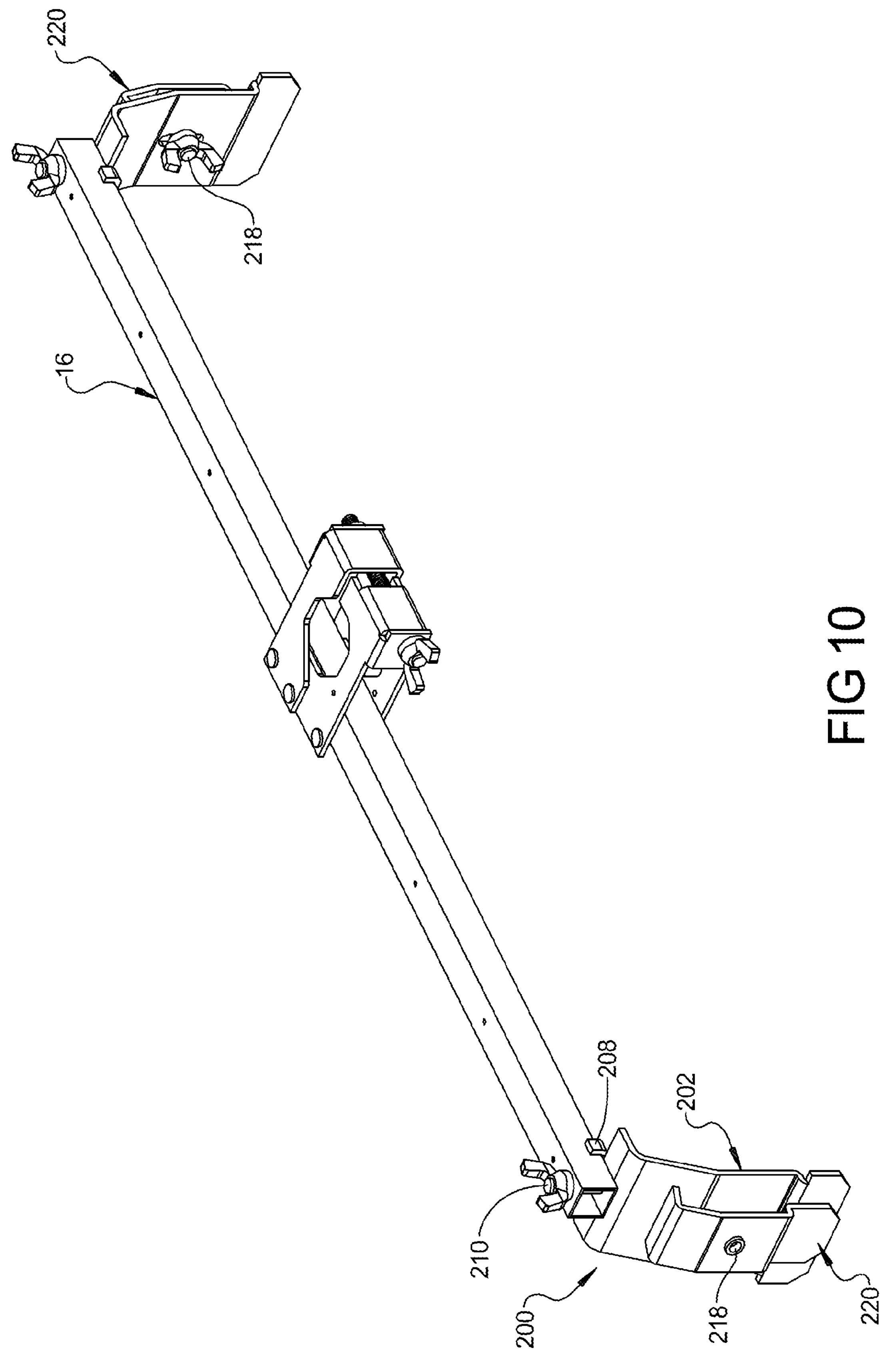
FIG. 10 is a perspective view of a support system for a fire protection sprinkler according to an alternative embodiment.
Figure 11C:
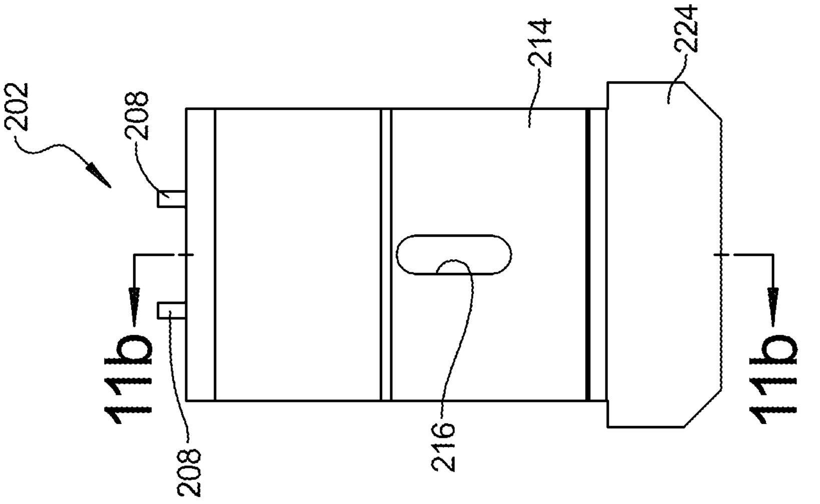
Figure 11B:
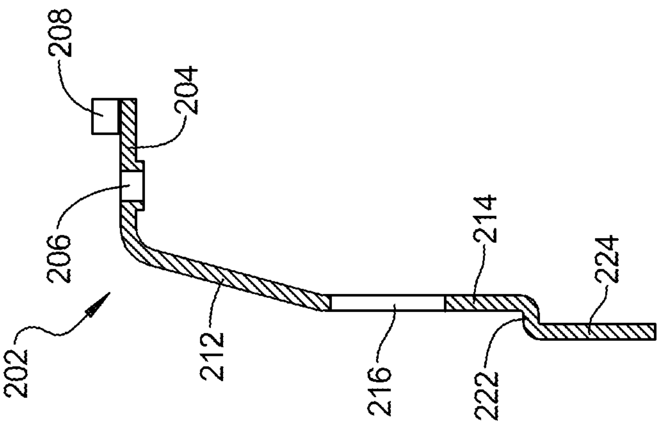
Figure 11A:
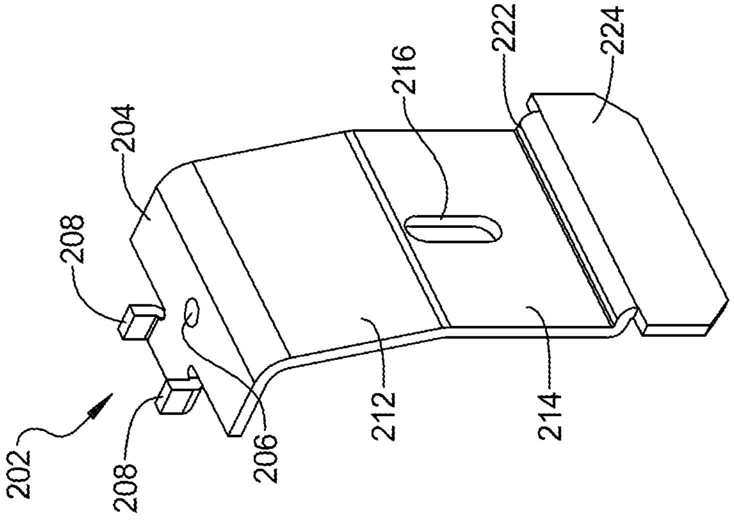
Figure 12C:
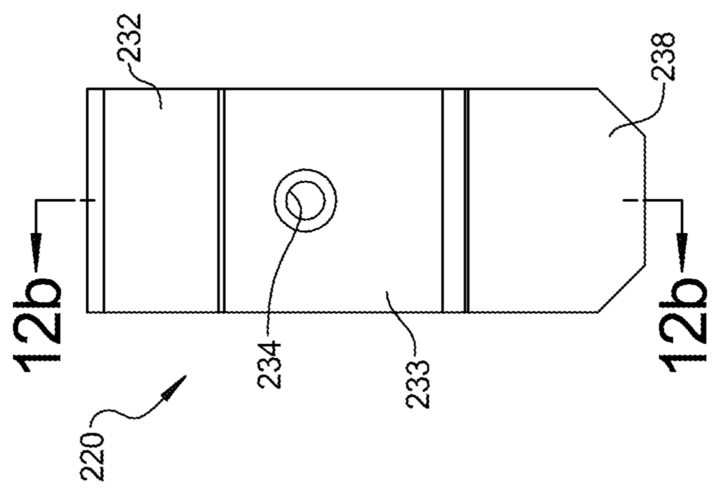
Figure 12B:
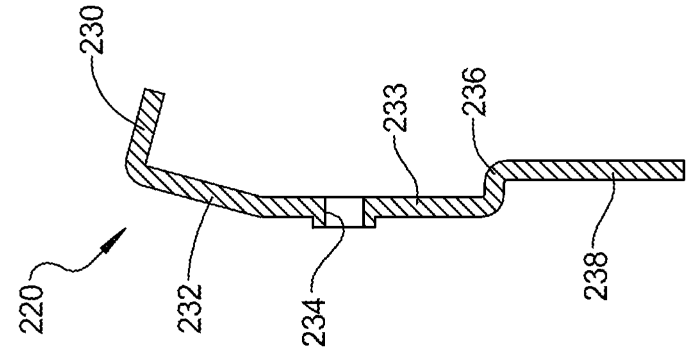
Figure 12A:
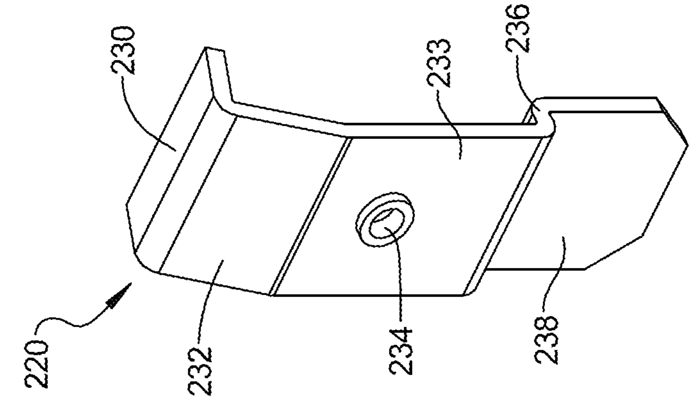

FIGS. 11*a*-11*c* are perspective, cross-sectional, and plan views of an inside bracket of an alternative end bracket assembly shown in FIG. 10; and FIGS. 12*a*-12*c* are perspective, cross-sectional, and plan views of an outside bracket of the end bracket assembly shown in FIG. 10.

Corresponding reference numerals indicate corresponding parts throughout the several views of the drawings.

DETAILED DESCRIPTION

Example embodiments will now be described more fully with reference to the accompanying drawings.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an,"

and “the” may be intended to include the plural forms as well, unless the context clearly indicates otherwise. The terms “comprises,” “comprising,” “including,” and “having,” are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being “on,” “engaged to,” “connected to,” or “coupled to” another element or layer, it may be directly on, engaged, connected or coupled to the other element or layer, or intervening elements or layers may be present. In contrast, when an element is referred to as being “directly on,” “directly engaged to,” “directly connected to,” or “directly coupled to” another element or layer, there may be no intervening elements or layers present. Other words used to describe the relationship between elements should be interpreted in a like fashion (e.g., “between” versus “directly between,” “adjacent” versus “directly adjacent,” etc.). As used herein, the term “and/or” includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as “first,” “second,” and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as “inner,” “outer,” “beneath,” “below,” “lower,” “above,” “upper,” and the like, may be used herein for ease of description to describe one element or feature’s relationship to another element(s) or feature(s) as illustrated in the figures. Spatially relative terms may be intended to encompass different orientations of the device in use or operation in addition to the orientation depicted in the figures. For example, if the device in the figures is turned over, elements described as “below” or “beneath” other elements or features would then be oriented “above” the other elements or features. Thus, the example term “below” can encompass both an orientation of above and below. The device may be otherwise oriented (rotated 90 degrees or at other orientations) and the spatially relative descriptors used herein interpreted accordingly.

Figure 1:
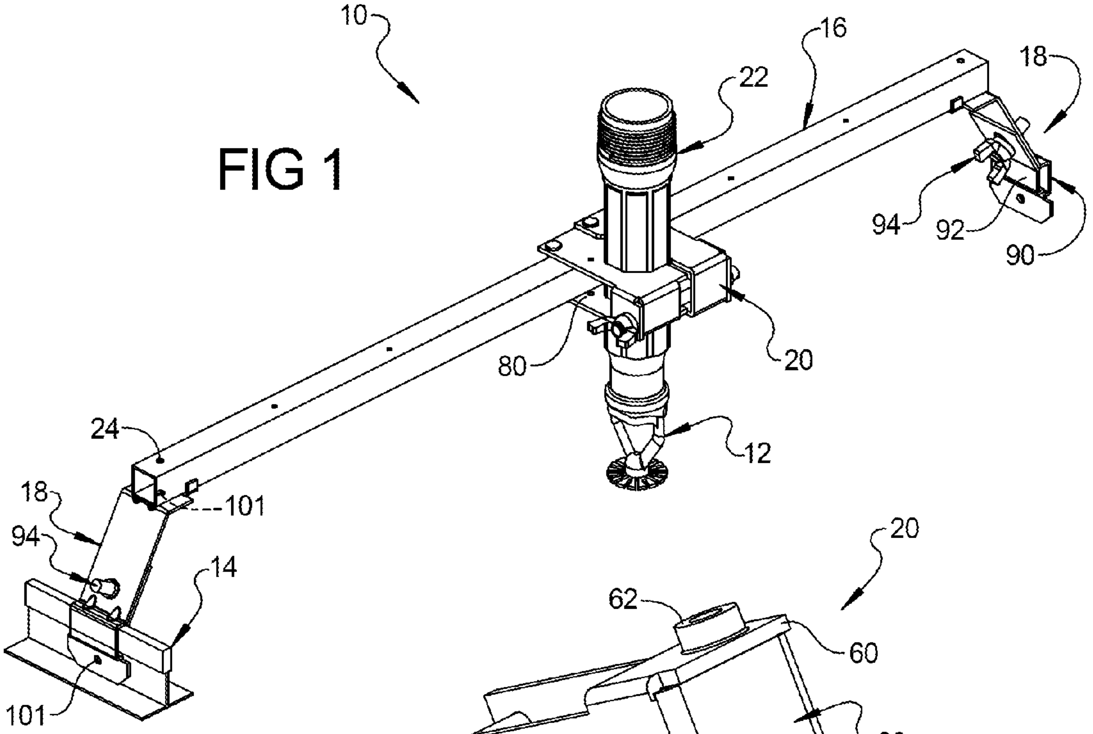
FIG. 1 is a perspective view of a support system for a fire protection sprinkler according to the principles of the present disclosure.

With reference to FIG. 1, a support system 10 is shown for supporting a fire protection sprinkler 12 to a pair of T-rails 14 of a drop ceiling system. The support system 10 includes a support bar 16 having a pair of end bracket assemblies 18 disposed at opposite ends thereof and a center bracket assembly 20 that is supported by the support bar 16 and engages a sprinkler adapter 22.

The support bar 16 preferably has a length that can be less than a distance between opposing T-rails 14. By way of non-limiting example, the support bar 16 can be between one and four inches shorter than the span between T-rails 14. The support bar 16 can have a square cross-sectional shape, although other shapes such as round, rectangular and other shapes could also be utilized. The support bar 16 can include a plurality of indentations 24 that serve as markers for insertion of a self-tapping sheet metal screw that can be utilized for mounting the end bracket assemblies 18 to the support bar 16.

Figure 2:
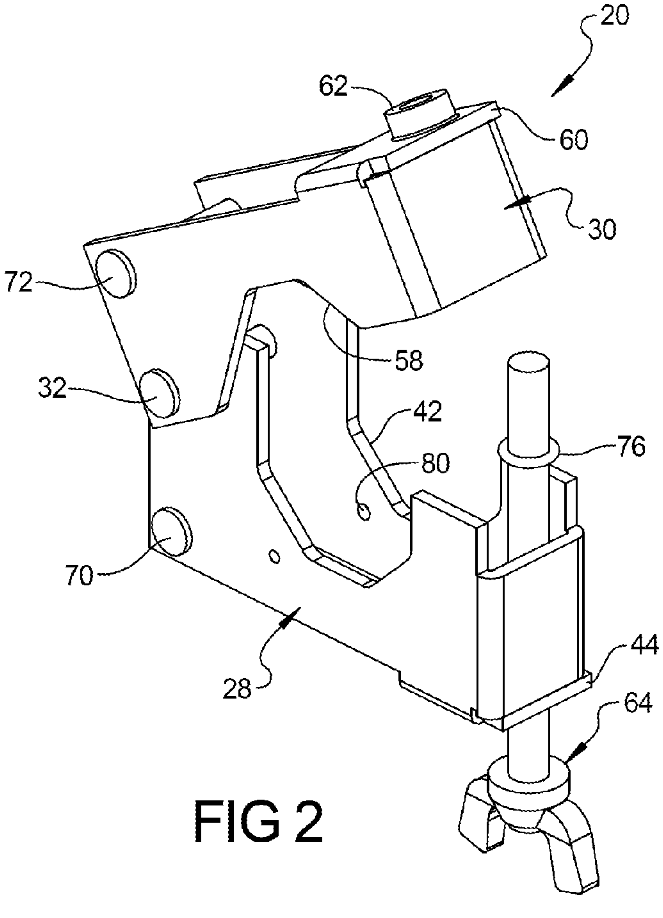
FIG. 2 is a perspective view of a center bracket assembly according to the principles of the present disclosure.
Figure 4:
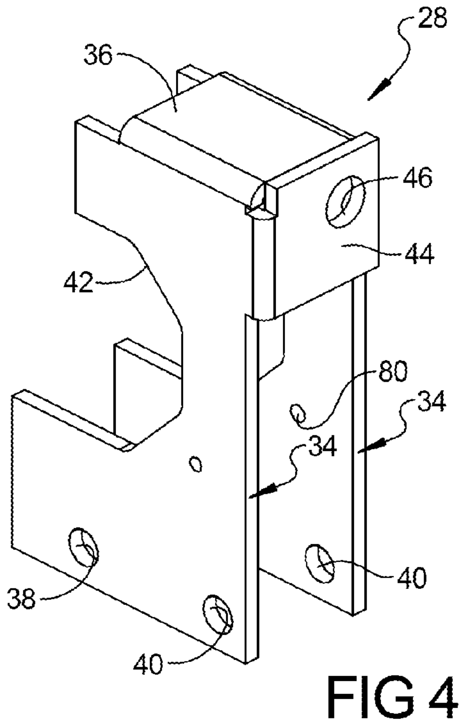
FIG. 4 is a perspective view of a support bracket of the center bracket assembly shown in FIG. 2.

With reference to FIG. 2, the center bracket assembly 20 will be described in greater detail. The center bracket assembly 20 includes a support bracket 28 and a hinge bracket 30 pivotally connected to the support bracket by a hinge pin 32. With reference to FIG. 4, the support bracket 28 includes a pair of side legs 34 connected to one another by a center member 36 to form a U-shaped body. The side legs 34 each include a hinge aperture 38 and a support aperture 40 extending therethrough. The side legs 34 also each include a recess 42 that can include a partial hexagonal surface for mating with the sprinkler adapter 22. A tab 44 can extend from one of the side legs 34 or the center member 36 and can include an aperture 46 therethrough. In the embodiment shown, the tab 44 extends from one of the side legs 34 and overlaps the other side leg as well as the center member 36 in order to provide structural support to the tab 44.

Figure 3:
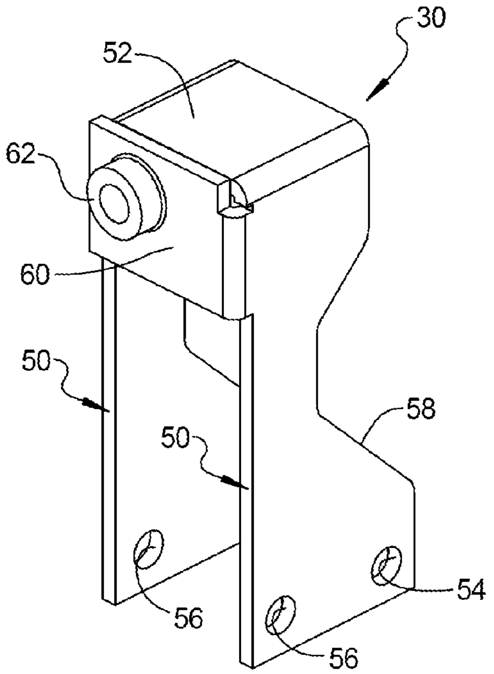
FIG. 3 is a perspective view of a hinge bracket of the center bracket assembly shown in FIG. 2.
Figure 8:
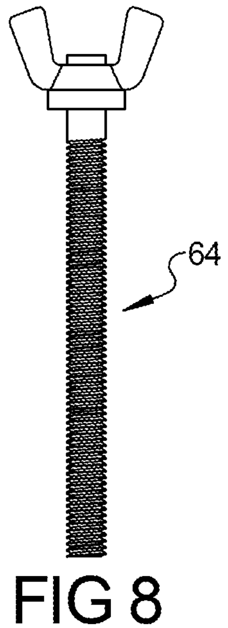
FIG. 8 is a side plan view of a wing screw used with the center bracket assembly shown in FIG. 2.
Figure 9:
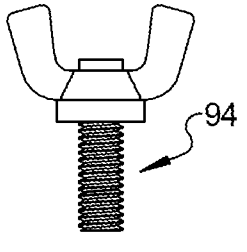
FIG. 9 is a side plan view of the wing screw used with the end bracket assembly shown in FIG. 5.

With reference to FIG. 3, the hinge bracket 30 will now be described. The hinge bracket 30 includes a pair of side legs 50 that are connected to one another by a center member 52 to form a U-shaped body. Each of the side legs 50 includes a hinge aperture 54 and a support aperture 56 extending therethrough. The side legs 50 also include a recess 58 that can define a partial hexagonal surface for engaging the sprinkler adapter 22. A tab 60 can extend from one of the side legs 50 or the center member 52 and can include an internally threaded boss 62 having internal threads for engaging with a threaded fastener, such as wing screw 64 illustrated in FIGS. 1, 2 and 8. The tab 60 as illustrated in FIG. 3 extends from one of the side legs 50, and can overlap the other side wall 50 as well as the center member 52 in order to provide structural support thereto.

In the assembled condition, as illustrated in FIG. 2, the hinge bracket 30 is pivotally connected to the support bracket 28 by the hinge pin 32. In addition, a support pin 70 is inserted through the support apertures 40 of the support bracket 28 and a support pin 72 is inserted through the support apertures 56 provided in the hinge bracket 30. The support bar 16 is inserted between the side leg 34 of the support bracket which are received between the side legs 50 of the hinge bracket 30. The support bar 16 is disposed against the hinge pin 32 and support pins 70, 72 in the assembled condition. The center bracket assembly 20 is openable to receive the sprinkler adapter 22 therein so that the hexagonal shaped recesses 42, 58 engage the sprinkler adapter 22 for defining a hexagonal opening for receipt thereof. Wing screw 64 is inserted through the aperture 46 provided in the tab 44 of the support bracket 28 and is threadedly engaged with the threaded boss 60 provided in the tab 61 of the hinge bracket 30. A bolt retainer in the form of an O-ring 76 can be mounted to the wing screw 64 in order to keep the wing screw 64 from falling out of the aperture 46 in the support bracket 28 prior to installation. The side legs 34 of the support bracket 28 can include internally extending projections 80 which can engage the support bar 16 to aid in retaining the support bracket 28 against the support bar 16 and to prevent the center bracket assembly 20 from sliding freely relative thereto when the center bracket assembly 20 is in an open condition.

Figure 5:
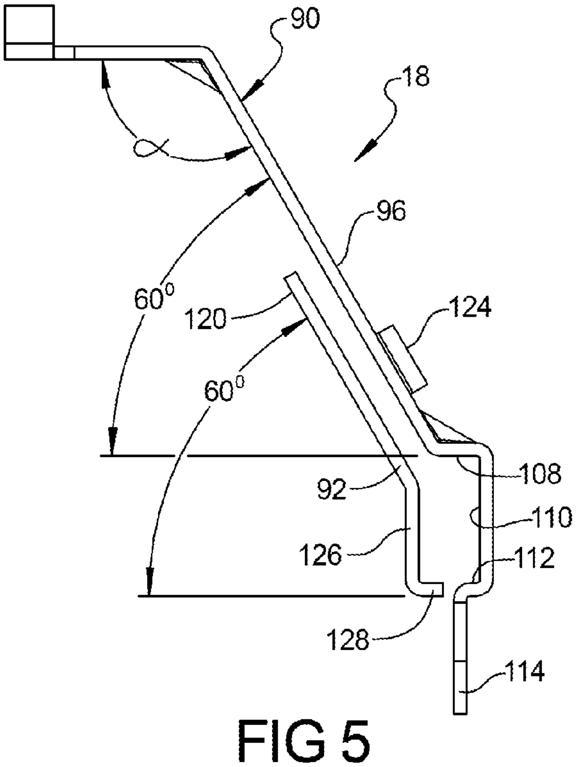
FIG. 5 is a side view of an end bracket assembly according to the principals of the present disclosure.
Figure 7:
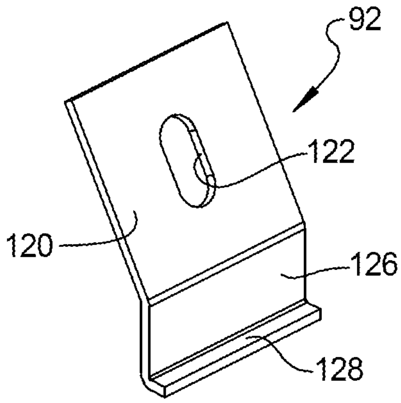
FIG. 7 is a perspective view of the inside bracket of the end bracket assembly shown in FIG. 5.
Figure 6:
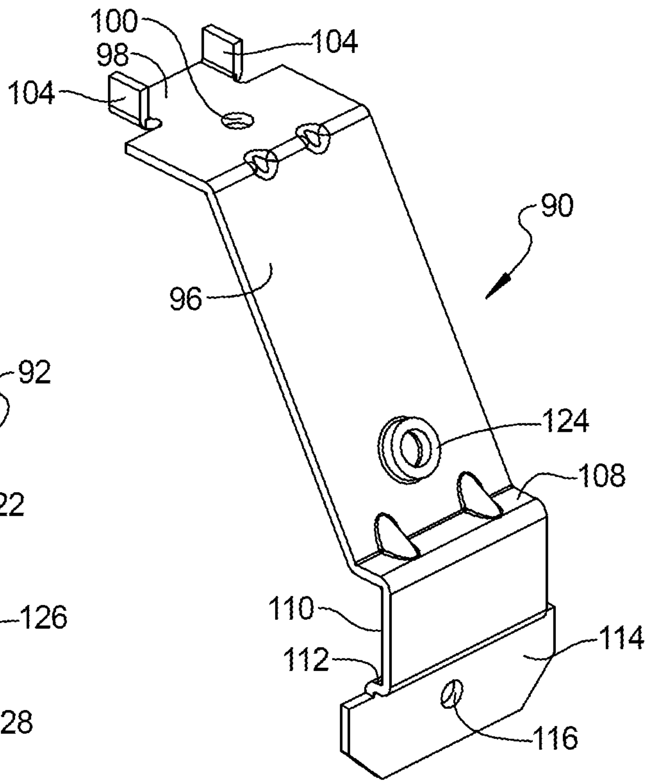
FIG. 6 is a perspective view of an outside bracket of the end bracket assembly shown in FIG. 5.

With reference to FIGS. 5-7, the end bracket assembly will now be described. The end bracket assembly 18 can include an outside bracket 90 (FIG. 6) and an inside bracket 92 (FIG. 7). The inside bracket 92 can be mounted to the outside bracket 90 by a wing screw 94 as illustrated in FIG. 1. Alternatively, the inside bracket 92 can be integrally formed with the outside bracket 90 as a bent tab extending from the main body of the outside bracket 90.

The outside bracket 90 can include an angled body 96 having a mounting tab 98 extending from an upper end thereof. Mounting tab 98 can include an aperture 100 extending therethrough for receiving a self-tapping sheet metal screw 101 that can be screwed into an underside of the support bar 16. A pair of side tabs 104 can extend from the mounting tab 98 on opposite sides thereof for engaging the support bar 16 therebetween. The side tabs 104 can be offset from the aperture 100 so as to prevent rotation of the outside bracket 90 relative to the support bar 16. The mounting tab 98 can be bent at an angle a of between 105° and 135° relative to the angled body 96. More preferably, the angled body 96 is angled at 120° from the mounting tab 98.

The outside bracket 90 includes an upper support surface disposed at a lower end of the angled body 96. The upper support surface 108 is designed to rest against a top of an upper bar of the T-rail of the suspended ceiling system. An outer clamp face 110 extends downward from the upper support portion 108 and is designed to be disposed against a side surface of the upper bar of the T-rail. A lower flange 112 extends inward from the outer clamp face 110 and is designed to engage underneath the upper bar of the T-rail 14. A mount flange 114 extends downward from the inner end of the lower flange 112 and can include an aperture 116 therethrough for receiving a self-tapping sheet metal screw 101 that can be screwed into the T-rail 14 of the drop ceiling system.

The inside bracket 92 includes an angled body 120 that can include an elongated slot 122 for receiving the wing screw 94 therethrough. The wing screw 94 is then inserted into the threaded aperture 124 provided in the angled body 96 of the outside bracket 90. The inside bracket 92 includes an inner clamp face 126 extending from the lower end of the angled body 120 which is designed to be disposed against the side of the upper bar of the T-rail 14. A lower flange 128 extends from a lower end of the inner clamp face 126 toward the lower flange 112 of the outside bracket 90. In the assembled condition, the wing screw 94 is tightened to draw the inside bracket 92 into tight engagement with the outside bracket 90 thereby trapping the upper bar of the T-rail 14 therebetween.

With the angled body 96 and angled body 120 of the outside and inside brackets 90, 92, extending laterally inward from the upper bar of the t-rail 14, the end bracket assembly 18 provides minimal interference with light fixtures or other structures mounted next to the ceiling panel through which the sprinkler 12 extends. Furthermore, the angled body 96 of the outside bracket 90 allows the head of the wing screw 94 to be easily accessed by an installer since the screw is angled downward for easy turning by the installer. In addition, the wing screw 64 of the center bracket assembly 20 extends generally parallel to the support bar 16 and allows easy access for the installer to tighten the wing screw 64 without interference from other structures.

With reference to FIGS. 10-12, an alternative end bracket assembly 200 will now be described. The end bracket assembly 200 can include an inside bracket 202 (FIGS. 11*a*-11*c*) wherein the inside bracket 202 includes an upper portion 204 having a threaded aperture 206 and a pair of tabs 208 that are spaced from one another. The threaded hole 206 in the upper portion 204 receives a wing bolt 210 for securing the bracket assembly 200 to the support bar 16. The tabs 208 are spaced so as to receive the support bar 16 therebetween and align the end bracket assembly 200 relative to the support beam 16. The inside bracket 202 includes an angled downwardly extending portion 212 extending from the upper portion 204 and a generally vertical portion 214 extending from the bottom of the angularly extending portion 212. The vertical portion 214 includes an elongated vertical slot 216 that receives a wing bolt 218 for securing an outside bracket 220 to the inside bracket 202. The lower end of the inside bracket 202 includes a step portion 222 that is designed to extend underneath the upper bead of a rail of a drop ceiling. A lower end 224 of the inside bracket 202 is designed to clamp against a web portion of the rail of the drop ceiling.

The outside bracket 220 is shown in detail in FIGS. 12*a*-12*c* of the drawings, and includes an upper portion 230 that serves as a spacing feature for spacing the outside bracket 220 from the inside bracket 202. An angled sidewall portion 232 extends from the upper portion 230 and a generally vertical portion 233 extends from the angled sidewall portion and includes a threaded aperture 234 therein for receiving the wing bolt 218 for securing the outside bracket 220 to the inside bracket 202. The outside bracket 220 includes a lower step portion 236 which is designed to be received under the upper bead of the rail of the drop ceiling system while the lower portion 238 of the outside bracket 220 is designed to be disposed against the web portion of the drop ceiling rail so as to clamp the web portion of the rail between the inside bracket 202 and the outside bracket 220 when the wing bolt 218 is tightened. In the assembled condition, the upper portion 230 is generally perpendicular to the angled downwardly extending portion 212 of the inside bracket 202 and is generally perpendicular to the angled sidewall portion 232 of the outside bracket 220. The angled downwardly extending portion 212 and the angled sidewall portion 232 are generally parallel to one another, as are the generally vertical portion 214 and the generally vertical portion 233 and the lower end 224 and the lower portion 238 of the inside and outside brackets.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A support system for a fire protection sprinkler, comprising:

a support bar having first and second ends;

a center bracket assembly mounted on said support bar; and a pair of end bracket assemblies disposed at said ends of said support bar, said end bracket assemblies each including an inside bracket having an inboard surface facing toward said center bracket and an outboard surface facing away from said center bracket and an outside bracket secured to said inside bracket with an entirety of said outside bracket being disposed on an outboard side of the outboard surface of said inside bracket relative to the center bracket assembly wherein said inside bracket has an upper end connected to said support bar and includes an angled body portion extending laterally outward from said upper end away from said center bracket and a generally vertical body portion integrally formed with and extending from a lower end of said angled body portion, said outside bracket having a bent upper portion that abuts against said outboard surface of said inside bracket, said outside and said inside brackets defining a channel therebetween for receiving an upper rail of a T-shaped rail of a drop ceiling system.

2. The support system according to claim 1, wherein said bent upper portion of said outside bracket engages with and is generally perpendicular to said angled body portion of said inside bracket.

3. The support system according to claim 1, wherein said inside and outside brackets each include an integrally formed lower end portion adapted to clamp against a web portion of a rail of a drop ceiling system.

4. A support system for a fire protection sprinkler, comprising:

a support bar having first and second ends;

a center bracket assembly mounted on said support bar; and a pair of end bracket assemblies disposed at said ends of said support bar, said end bracket assemblies each including an inside bracket having an inboard surface facing toward said center bracket and an outboard surface facing away from said center bracket and an outside bracket secured to said inside bracket with an entirety of said outside bracket being disposed on an outboard side of the outboard surface of said inside bracket relative to the center bracket assembly wherein said inside bracket has an upper end connected to said support bar and includes an angled body portion extending laterally outward from said upper end away from said center bracket and a generally vertical body portion extending from a lower end of said angled body portion, said outside bracket having a bent upper portion that abuts against the outboard surface of said inside bracket, said outside and said inside brackets defining a channel therebetween for receiving an upper rail of a T-shaped rail of a drop ceiling system, wherein said upper end of said inside bracket includes a mounting tab having an aperture therein and said end bracket assemblies are secured to said support bar via a screw inserted through said aperture.

5. The support system according to claim 4, wherein said upper end of said inside bracket includes a pair of side tabs on opposite sides of said support bar and extending generally perpendicular to said mounting tab.

6. The support system according to claim 4, wherein said angled body portion extends at an angle of between 95 and 115 degrees from said mounting tab.

7. The support system according to claim 6, wherein said angled body portion extends at an angle of approximately 105 degrees from said mounting tab.

8. A support system for a fire protection sprinkler, comprising:

a support bar having first and second ends;

a center bracket assembly mounted on said support bar; and a pair of end bracket assemblies disposed at said ends of said support bar, said end bracket assemblies each including an inside bracket having an inboard surface facing toward said center bracket and an outboard surface facing away from said center bracket and an outside bracket secured to said inside bracket with a threaded fastener with an entirety of said outside bracket being disposed on an outboard side of the outboard surface of said inside bracket relative to the center bracket assembly wherein said inside bracket has an upper end connected to said support bar and includes an angled body portion extending laterally outward from said upper end away from said center bracket and a generally vertical body portion extending from a lower end of said angled body portion, said outside bracket having a bent upper portion that abuts against the outboard surface of said inside bracket, said outside and said inside brackets defining a channel therebetween for receiving an upper rail of a T-shaped rail of a drop ceiling system.

9. The support system according to claim 8, wherein said bent upper portion of said outside bracket engages with and is generally perpendicular to said angled body portion of said inside bracket.

10. The support system according to claim 8, wherein said inside and outside brackets each include an integrally formed lower end portion adapted to clamp against a web portion of a rail of a drop ceiling system.

* * * * *

UNITED STATES PATENT AND TRADEMARK OFFICE

CERTIFICATE OF CORRECTION

PATENT NO. : 9,004,422 B2
APPLICATION NO. : 13/625303
DATED : April 14, 2015
INVENTOR(S) : Shawn J. Feenstra It is certified that error appears in the above-identified patent and that said Letters Patent is hereby corrected as shown below:

In the Specification:

At column 4, line number 52, delete “60” and insert --62--, therefor.

At column 4, line number 53, delete “61” and insert --60--, therefor.

At column 5, line number 45, delete “t-rail” and insert --T-rail--, therefor.

Signed and Sealed this
Fourth Day of August, 2015

Michelle K. Lee
*Director of the United States Patent and Trademark Office*